United States Patent
Loh et al.

(10) Patent No.: US 9,235,514 B2
(45) Date of Patent: Jan. 12, 2016

(54) PREDICTING OUTCOMES FOR MEMORY REQUESTS IN A CACHE MEMORY

(71) Applicant: Advanced Micro Devices, Inc., Sunnyvale, CA (US)

(72) Inventors: Gabriel H. Loh, Bellevue, WA (US); Jaewoong Sim, Atlanta, GA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 385 days.

(21) Appl. No.: 13/736,254

(22) Filed: Jan. 8, 2013

(65) Prior Publication Data
US 2014/0143502 A1 May 22, 2014

Related U.S. Application Data

(60) Provisional application No. 61/728,110, filed on Nov. 19, 2012.

(51) Int. Cl.
*G06F 12/00* (2006.01)
*G06F 12/08* (2006.01)

(52) U.S. Cl.
CPC ........ *G06F 12/0802* (2013.01); *G06F 12/0804* (2013.01); *G06F 12/0862* (2013.01)

(58) Field of Classification Search
CPC ............ G06F 12/0862; G06F 12/0804; G06F 12/0802; G06F 12/08
USPC .................................................. 711/138, 170
See application file for complete search history.

(56) References Cited

U.S. PATENT DOCUMENTS

| 5,864,854 | A * | 1/1999 | Boyle | 1/1 |
| 6,307,855 | B1 * | 10/2001 | Hariguchi | 370/392 |
| 7,937,538 | B2 * | 5/2011 | Furtek et al. | 711/149 |
| 8,630,294 | B1 * | 1/2014 | Keen et al. | 370/392 |

OTHER PUBLICATIONS

A. Yoaz et al., "Speculation techniques for improving load related instruction scheduling," in the Int'l Symp. on Computer Architecture, 1999.
R.E. Kessler, "The Alpha 21264 Microprocessor," in IEEE Micro, v.19, 1999.

* cited by examiner

*Primary Examiner* — Matthew Bradley
(74) *Attorney, Agent, or Firm* — Park, Vaughan, Fleming & Dowler LLP

(57) ABSTRACT

The described embodiments include a cache controller with a prediction mechanism in a cache. In the described embodiments, the prediction mechanism is configured to perform a lookup in each table in a hierarchy of lookup tables in parallel to determine if a memory request is predicted to be a hit in the cache, each table in the hierarchy comprising predictions whether memory requests to corresponding regions of a main memory will hit the cache, the corresponding regions of the main memory being smaller for tables lower in the hierarchy.

23 Claims, 6 Drawing Sheets

PREDICTING OUTCOMES FOR MEMORY REQUESTS IN A CACHE MEMORY

RELATED CASES

The instant application is a non-provisional application from, and hereby claims priority under 35 U.S.C. §119 to, pending U.S. provisional patent application No. 61/728,110, which is titled "A Mostly-Clean DRAM Cache for Effective Hit Speculation and Self-Balancing Dispatch," by inventors Jaewoong Sim, Gabriel H. Loh, Hyesoon Kim, James M. O'Connor, and Mithuna Thottehodi, which was filed on 19 Nov. 2012, and which is herein incorporated by reference.

BACKGROUND

1. Field

The described embodiments relate to caches in electronic devices. More specifically, the described embodiments relate to a technique for predicting the outcomes of memory requests in a cache memory.

2. Related Art

Many modern computing devices (e.g., laptop/desktop computers, smart phones, set-top boxes, appliances, etc.) include a processing subsystem with one or more caches. Caches are generally smaller, fast-access memory circuits located in or near the processing subsystem that can be used to store data that is retrieved from lower levels of a memory hierarchy in the computing device (i.e., other, larger caches and/or memories) to enable faster access to the stored data.

During operation in such computing devices, memory requests are sent to a cache in an attempt to quickly resolve the memory requests. When attempts to resolve memory requests in the cache fail (i.e., when the memory requests "miss" in the cache), the memory requests are forwarded to a lower level of the memory hierarchy to be resolved. Because determining that the memory request has missed in the cache takes time and fruitlessly consumes resources (e.g., bandwidth on signal busses, processing time in the cache, etc.), misses in caches are undesirable.

SUMMARY

The described embodiments include a cache controller with a prediction mechanism in a cache. In the described embodiments, the prediction mechanism is configured to perform a lookup in each table in a hierarchy of lookup tables in parallel to determine if a memory request is predicted to be a hit in the cache, each table in the hierarchy comprising predictions whether memory requests to corresponding regions of a main memory will hit the cache, the corresponding regions of the main memory being smaller for tables lower in the hierarchy.

In some embodiments, when performing the lookup in each table in the hierarchy, the prediction mechanism is configured to compute an index for each table in the hierarchy using information from the memory request, the index indicating a location in the corresponding table of a prediction of whether the memory request will hit in the cache. In these embodiments, the prediction mechanism is configured to use each index to retrieve, from the corresponding table, a prediction of whether the memory request will hit in the cache. In some embodiments, when computing the index for each table in the hierarchy using information from the memory request, the prediction mechanism is configured to compute a result of a hash function for each table, the hash function taking the information from the memory request as an input and outputting an index for the corresponding table.

In some embodiments, during the lookup in each table in the hierarchy in parallel, the prediction mechanism is configured to retrieve, from one or more of the tables, a prediction of whether the memory request will hit in the cache. In these embodiments, the prediction mechanism is configured to use a prediction from a lowest table in the hierarchy from which a prediction was retrieved to determine if the memory request is predicted to hit in the cache.

In some embodiments, upon resolving the memory request and determining that the prediction was correct, the cache controller is configured to update the prediction for the corresponding region of the main memory in the table from which the prediction was used.

In some embodiments, upon resolving the memory request and determining that the prediction was incorrect, the cache controller is configured to update the prediction for the corresponding region of the main memory in the table from which the prediction was used. In some of these embodiments, when a next lower table from the table from which the prediction was used exists in the hierarchy, the cache controller is configured to add a prediction for a corresponding smaller region of the main memory to the next lower table.

In some embodiments, upon resolving the memory request and determining that the prediction was incorrect, when a next lower table from the table from which the prediction was used exists in the hierarchy, the cache controller is configured to add a prediction for a corresponding smaller region of the main memory to the next lower table. In some of these embodiments, when a when a next lower table from the table from which the prediction was used does not exist in the hierarchy, the cache controller is configured to update the prediction for the corresponding region of the main memory in the table from which the prediction was used.

In some embodiments, the cache controller is configured to send the memory request to the cache for resolution when the memory request is predicted to be a hit in the cache, and send the memory request to a lower level of the memory hierarchy when the memory request is not predicted to be a hit in the cache.

In some embodiments, the cache controller is configured to dynamically set a size of the regions of the main memory for at least one corresponding table in the hierarchy.

BRIEF DESCRIPTION OF THE FIGURES

Throughout the figures and the description, like reference numerals refer to the same figure elements.

DETAILED DESCRIPTION

Figure 1:
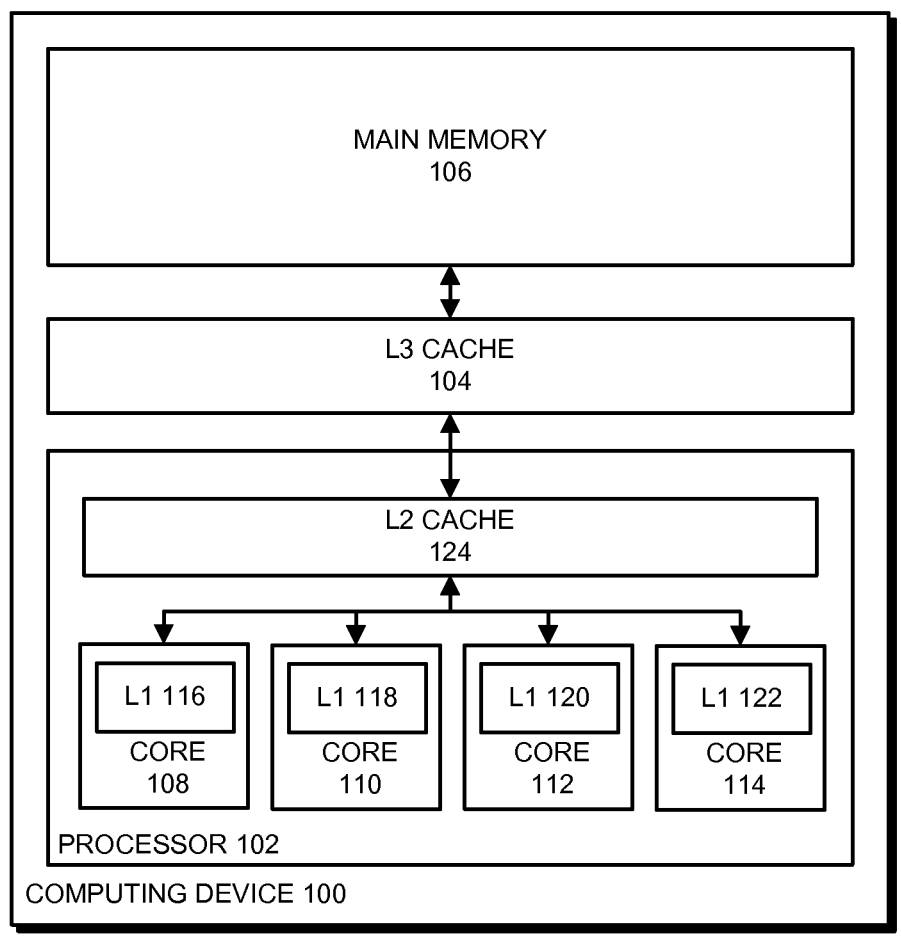
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., some or all of computing device 100 (see FIG. 1), cache controller 204 (see FIG. 2), prediction mechanism 216, etc. and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits that perform the described operations. In some embodiments, the circuits in a functional block include circuits that execute program code (e.g., machine code, firmware, etc.) to perform the described operations.

Overview

The described embodiments include a prediction mechanism that provides predictions of whether memory requests are directed to cache blocks that are present in a cache (and, thus, the memory requests are likely to "hit" in the cache). Predictions from the prediction mechanism are used by a cache controller in the cache to determine if an attempt to resolve the memory request is to be made in the cache or if the memory request is to be sent to a lower level of a memory hierarchy for resolution. For example, in some embodiments, if the memory request is predicted to hit in the cache, an attempt to resolve the memory request is made in the cache, otherwise, the memory request is sent to a lower level of the memory hierarchy for resolution.

In some embodiments, the prediction mechanism includes a hierarchy of lookup tables that includes two or more tables. In these embodiments, each table in the hierarchy includes predictions whether memory requests to corresponding regions of a main memory will hit in the cache, with the corresponding regions of the main memory being smaller for tables lower in the hierarchy. For example, in some embodiments, the hierarchy of tables includes three tables; the first/highest table in the hierarchy includes predictions for regions of the main memory that are 4 megabytes (MB) in size, the second/middle table in the hierarchy includes predictions for regions of the main memory that are 256 kilobytes (KB) in size, and the third/lowest table in the hierarchy includes predictions for regions of the main memory that are 4 KB in size. In the tables in the hierarchy, each prediction is a general prediction that serves for the entire corresponding region. Thus, a prediction for a given region applies to any memory request with an address in a corresponding range of addresses in main memory (e.g., to any of the 64 different memory requests for 64-byte cache blocks that may be made within a given region in the case of the 4 KB regions in the third table above, etc.).

When providing a prediction for a memory request, the prediction mechanism uses information from the memory request (e.g., address information from the request, a source for the request, etc.) to perform a lookup in each table in the hierarchy in parallel and retrieve, from one or more of the tables, a prediction of whether the memory request is to be a hit the cache. The prediction mechanism then uses a prediction from a lowest table in the hierarchy from which a prediction was retrieved as the prediction of whether the memory request will hit in the cache. For example, assuming that the first table (4 MB regions) and the second table (256 KB regions) from the example above have predictions for a region in the main memory to which the memory request is directed, the prediction from the second and lower table in the hierarchy is used as the prediction of whether the memory request will hit in the cache. Hence, in these embodiments, a prediction about memory requests from a smaller/more specific region of the main memory is used to determine if the memory request will hit in the cache.

In some embodiments, the tables in the hierarchy are updated based on a resolution of the memory request. For example, whether the memory request is correctly predicted (e.g., predicted to hit and actually hit) or incorrectly predicted (e.g., predicted to hit and actually missed), a prediction for the corresponding region of the main memory in each table where such a prediction exists can be updated accordingly. In some embodiments, updating the tables when a memory request is incorrectly predicted includes, when a next lower table from the table from which the prediction was used exists in the hierarchy, adding a prediction for a corresponding smaller region of the main memory to the next lower table. For example, and continuing the example above, if the prediction from the second table is eventually found to be incorrect, an entry for a region of the main memory to which the memory request is directed can be added to the third table. In this way, when a prediction is incorrect, a finer-grained prediction is added to the lower table to enable more-accurate future predictions.

In some embodiments, the prediction mechanism is implemented in a circuit structure that performs the lookup rapidly and with a minimal number of circuit elements (e.g., memory circuits, etc.). The circuit structure is described in more detail below.

By predicting whether memory requests will hit in the cache as described, the described embodiments improve the performance of memory requests in computing devices, which can help to improve the overall performance of the computing device. In addition, by using the optimized circuit structure, the prediction mechanism can be fabricated in a relatively small area on an integrated circuit chip, which means that the prediction mechanism can be used where area is constrained and can be placed closer to circuits that use the predictions.

Computing Device

FIG. 1 presents a block diagram illustrating a computing device 100 in accordance with some embodiments. As can be seen in FIG. 1, computing device 100 includes processor 102, L3 cache 104, and main memory 106. Processor 102 is generally a device that performs computational operations in computing device 100. Processor 102 includes four processor cores 108-114, each of which includes a computational mechanism such as a central processing unit (CPU), a graphics processing unit (GPU), and/or an embedded processor.

Processor 102 also includes cache memories (or "caches") that can be used for storing instructions and data that are used by processor cores 108-114 for performing computational operations. As can be seen in FIG. 1, the caches in processor 102 include a level-one (L1) cache 116-122 (e.g., "L1 116") in each processor core 108-114 that is used for storing instructions and data for use by the processor core. Generally, L1 caches 116-122 are the smallest of a set of caches in computing device 100 (e.g., 96 kilobytes (KB) in size) and are located closest to the circuits (e.g., execution units, instruction fetch units, etc.) in the processor cores 108-114 that use the instructions and data that are stored in the L1 caches 116-122. The closeness of the L1 caches 116-122 to the corresponding circuits enables the fastest access to the instructions and data stored in the L1 caches 116-122 from among the caches in computing device 100.

Processor 102 also includes a level-two (L2) cache 124 that is shared by processor cores 108-114 and hence is used for storing instructions and data for all of the sharing processor cores 108-114. Generally, L2 cache 124 is larger than the L1 caches 116-122 (e.g., 2048 KB in size) and is located outside, but close to, processor cores 108-114 on the same semiconductor die as the processor cores 108-114. Because L2 cache 124 is located outside the processor cores 108-114 but on the same die, access to the instructions and data stored in L2 cache 124 is slower than accesses to the L1 caches, but faster than accesses to L3 cache 104 in computing device 100.

Returning to computing device 100, the largest of the caches in computing device 100 (at e.g., 16 MB in size), level-three (L3) cache 104 is shared by the processor cores 108-114 and hence is used for storing instructions and data for all of the processor cores. In some embodiments, L3 cache 104 is located external to processor 102 (e.g., on a different die or dies than processor 102), or is located on a same die as processor 102, but separate from processor 102; accordingly, accessing data and instructions in L3 cache 104 is typically slower than accessing data and instructions in the lower-level caches.

In some embodiments, each of L1 caches 116-122, L2 cache 124, and L3 cache 104 (collectively, "the caches") include memory circuits that are used for storing cached data and instructions. For example, the caches can include one or more of static random access memory (SRAM), embedded dynamic random access memory (eDRAM), DRAM, double data rate synchronous DRAM (DDR SDRAM), and/or other types of memory circuits.

Main memory 106 comprises memory circuits that form a "main memory" of computing device 100. Main memory 106 is used for storing instructions and data for use by the processor cores 108-114 on processor 102. In some embodiments, main memory 106 is fabricated from memory circuits such as one or more of DRAM, SRAM, DDR SDRAM, and/or other types of memory circuits.

Taken together, L1 caches 116-122, L2 cache 124, L3 cache 104, and main memory 106 form a "memory hierarchy" in and for computing device 100. Each of the caches and main memory 106 are regarded as levels of the memory hierarchy, with the lower levels including the larger caches and main memory 106. Within computing device 100, memory requests are preferentially handled in the level of the memory hierarchy that results in the fastest and/or most efficient operation of computing device 100.

Although an embodiment is described with a particular arrangement of processor cores, some embodiments include a different number and/or arrangement of processor cores. For example, some embodiments have only one processor core (in which case the caches are used by the single processor core), while other embodiments have two, six, eight, or another number of processor cores—with the cache hierarchy adjusted accordingly. Generally, the described embodiments can use any arrangement of processor cores that can perform the operations herein described.

Additionally, although an embodiment is described with a particular arrangement of caches, some embodiments include a different number and/or arrangement of caches. For example, the caches (e.g., L1 caches 116-122, etc.) can be divided into separate instruction and data caches. Additionally, L2 cache 124 and or L3 cache 104 may not be shared in the same way as shown, and hence may only be used by a single processor core, two processor cores, etc. (and hence there may be multiple L2 caches 124 and/or L3 caches 104 in processor 102). As another example, some embodiments include different levels of caches, from only one level of cache to multiple levels of caches, and these caches can be located in processor 102 and/or external to processor 102. Generally, the described embodiments can use any arrangement of caches that can perform the operations herein described.

Moreover, although computing device 100 and processor 102 are simplified for illustrative purposes, in some embodiments, computing device 100 and/or processor 102 include additional mechanisms for performing the operations herein described and other operations. For example, computing device 100 and/or processor 102 can include power controllers, mass-storage devices such as disk drives or large semiconductor memories (as part of the memory hierarchy), batteries, media processors, input-output mechanisms, communication mechanisms, networking mechanisms, display mechanisms, etc.

Cache

Figure 2:
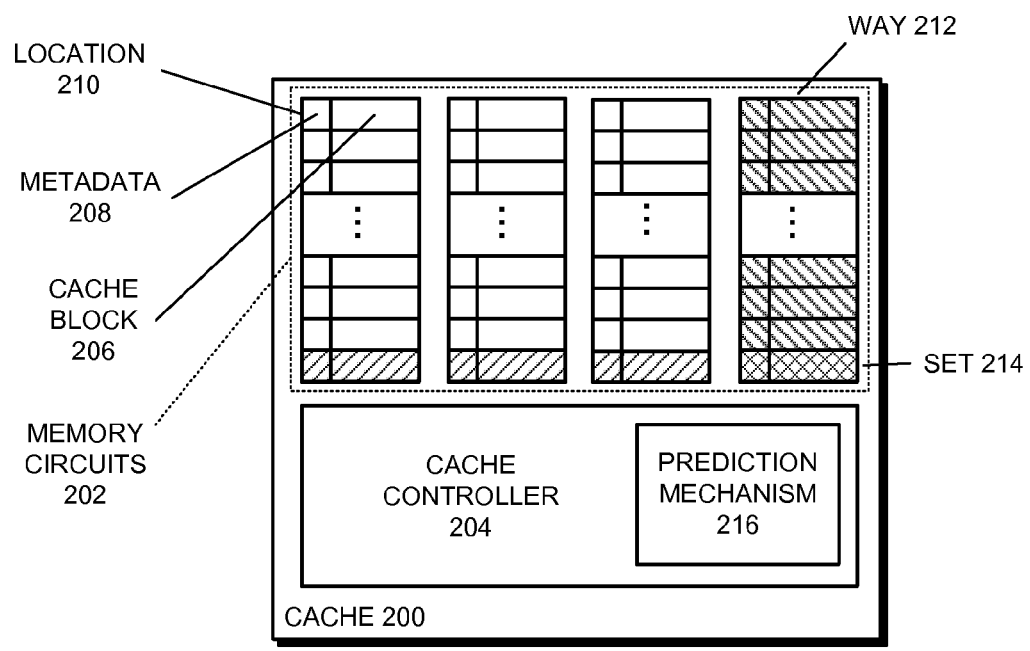
FIG. 2 presents a block diagram illustrating a cache in accordance with some embodiments.

FIG. 2 presents a block diagram illustrating a cache 200 in accordance with some embodiments. Cache 200 is a general example of an internal configuration that may be implemented in any of the caches in the described embodiments. For example, some or all of L1 caches 116-122, L2 cache 124, and L3 cache 104 can have, but are not required to have, internal configurations similar to cache 200.

As can be seen in FIG. 2, cache 200 includes memory circuits 202 and cache controller 204. Cache controller 204 is a functional block that performs various functions for controlling operations in cache 200. For example, cache controller 204 can manage storing cache blocks to, invalidating cache blocks in, and evicting cache blocks from cache 200; can perform lookups for cache blocks in cache 200; can handle coherency operations for cache 200; and/or can respond to requests for cache blocks from cache 200.

Memory circuits 202 (interchangeably called "memory" in cache 200) include one or more of SRAM, eDRAM, DRAM, DDR SDRAM, and/or other types of memory circuits that are divided into a set of locations, each location configured to store a cache block and metadata that includes information about the cache block (tags, indicators, flags, etc.). A cache block 206 and corresponding metadata 208 are labeled for example location 210 in cache 200. In some embodiments, each cache block comprises a cache line (although other embodiments can use different-sized cache blocks). Note that, although shown in a same "location" in cache 200, in some embodiments, the metadata and the cache block for each "location" are stored in two physically separate tables/arrays/memory circuits (e.g., a metadata array and a cache block array).

As described above, the memory in the caches in computing device 100 is limited (e.g., to 96 KB for L1 caches 116-122, 2048 KB for L2 cache 124, etc.), and so every cache block that may be loaded from main memory 106 cannot be simultaneously stored in a given cache. Instead, locations in the caches are shared, and therefore made available for storing cache blocks from various addresses in memory. In the described embodiments, any of a number of operations/policies can be used for managing the storage of cache blocks in the limited memory in the caches. For example, some embodiments use "set associativity" for managing the storage of cache blocks. For set associativity, the memory in the cache is divided into a number of sets, and the sets are further divided into a number of ways. As can be seen in FIG. 2, cache 200 includes four ways, with an example way 212 indicated by left-leaning hash marks in the rightmost of the four ways in cache 400. In an example embodiment where the memory in cache 200 is 512 KB in size and 1 KB cache blocks are to be stored in cache 200, each way has storage for 128 cache blocks, and hence each way includes 128 sets (with ellipses representing sets not shown in FIG. 2). Each of the sets has a location in each way, with an example set 214 indicated by right-leaning hash marks in the bottommost location in each of the four ways in cache 200. Each set can be used to store cache blocks from a range of memory addresses, and hence the corresponding location in each way for the set can be used to store cache blocks from the range of memory addresses.

In embodiments that use set associativity, upon receiving a cache block to be stored in cache 200 (e.g., from a processor core or a lower level in the memory hierarchy), cache controller 204 determines the set in which the received cache block is to be stored. For example, in some embodiments, cache controller 204 compute the set using a hash function for which the input is some or all of the address for the cache block. Cache controller 204 then determines if a location in the set can be used for storing the received cache block without replacing a cache block presently stored in that location (i.e., when there is an available/open location in the set). When a location in the set is available, cache controller 204 stores the cache block into the location.

However, when cache controller 204 determines that there is no location in the set that can be used without replacing a cache block presently stored in that location, cache controller 204 determines a cache block that is to be replaced from among the locations in the set. In other words, when each location in a given set is presently use for storing a cache block, in order to store a new cache block in the set, the cache block in one of the existing locations should be evicted from cache 200 (e.g., written to a lower level of cache or to memory and/or overwritten) to make space for the cache block. When determining the cache block that is to be replaced, cache controller 204 can adhere to a replacement policy, which is generally an algorithm or set of rules used to determine the cache block that is to be evicted. In some embodiments, the replacement policy can be a first-in-first out policy, in which the first cache block to be stored in a set is evicted, a least-recently-used policy, in which the least recently accessed location in the set is evicted, and/or another replacement policy. After evicting the cache block from the determined location, cache controller 204 can store the received cache block in the location.

Cache controller 204 includes prediction mechanism 216. Prediction mechanism 216 generates predictions of whether memory requests received by cache controller 204 from sources in computing device 100 (e.g., processor cores 108-114, lower-level caches, etc.) are directed to cache blocks that are present in cache 200 (and, hence, the memory requests are likely to hit in the cache). In some embodiments, prediction mechanism 216 takes information from a memory request (e.g., address information, information about the source of the memory request, information about the data being requested, etc.) as an input and outputs a response (e.g., a value representing a predicted hit/miss, a value representing a confidence in the prediction, an identifier of the memory request, etc.) that cache controller 204 uses to determine how to handle the corresponding memory request. For example, cache controller 204 can use the prediction generated by prediction mechanism 216 to determine if an attempt to resolve the memory request is to be made in cache 200 or if the memory request is to be sent to a lower level of a memory hierarchy for resolution. In some embodiments, if the memory request is predicted to hit in the cache, the memory request is attempted in the cache, otherwise, the memory request is sent to a lower level of the memory hierarchy (and the opposite is true for predicted misses).

Although cache 200 is described using certain functional blocks and a particular number of ways, some embodiments include different numbers and/or types of functional blocks and/or ways. For example, cache 200 can include 8, 16, or another number of ways. Generally, the described embodiments can include any functional blocks and/or ways in cache 200 and/or computing device 100 that enable the operations herein described. Moreover, although some embodiments are described using set associativity, other embodiments use different types of associativity and/or different management policies for cache 200. For example, some embodiments use skewed associativity, full associativity, etc.

In addition, although prediction mechanism 216 is shown in cache controller 204, in some embodiments, prediction mechanism 216 is located elsewhere in computing device 100. For example, prediction mechanism 216 can be incorporated into a memory controller (not shown) in computing device 100. Generally, prediction mechanism 216 can be located anywhere in computing device 100 where prediction mechanism 216 can perform the operations herein described.

Prediction Mechanism

Figure 3:
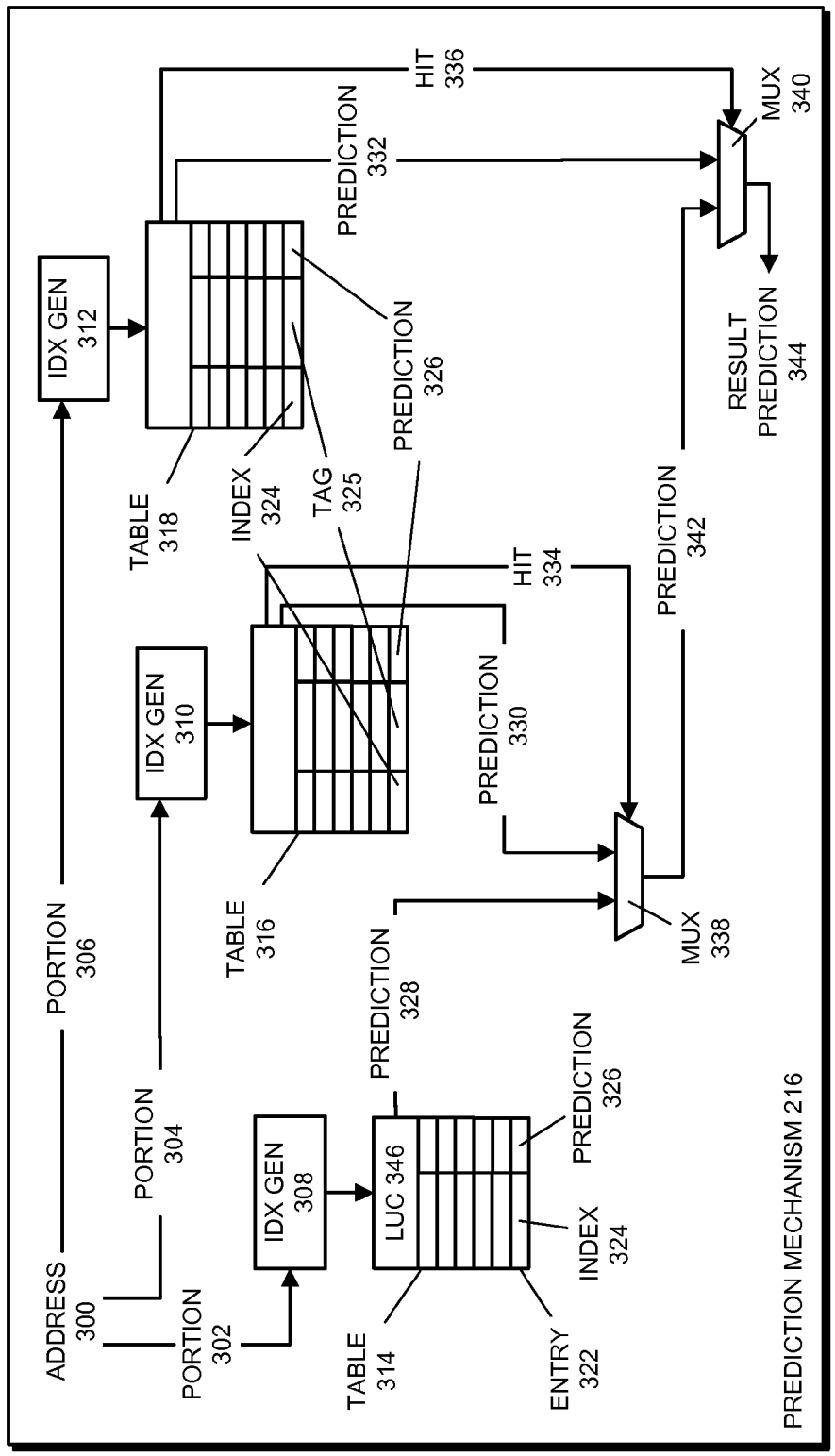
FIG. 3 presents a block diagram illustrating a prediction mechanism in accordance with some embodiments.

FIG. 3 presents a block diagram illustrating a prediction mechanism 216 in accordance with some embodiments. Generally, prediction mechanism 216 provides predictions of whether memory requests are directed to cache blocks that are present in a cache (and, thus, the memory requests are likely to hit in the cache). In some embodiments, cache controller 204 can use the predictions when performing operations, configuring circuits, etc. For example, in some embodiments, cache controller 204 uses predictions from prediction mechanism 216 to determine if an attempt to resolve the memory request is to be made in the cache or if the memory request is to be sent to a lower level of a memory hierarchy for resolution. As another example, in some embodiments, cache controller 204 uses the predictions to determine if a given circuit is to be placed in a predetermined operating mode (e.g., a low-power mode, a full-power mode, etc.).

As described above, prediction mechanism 216 includes a hierarchy of lookup tables 314-318 that holds predictions of whether memory requests directed to corresponding regions of main memory 106 will hit in cache 200. Within the hierarchy of tables, a highest table holds predictions for the largest regions of main memory 106 and each lower table holds predictions for successively smaller regions of main memory 106. For example, in some embodiments, table 314 is the highest table, and holds predictions for the largest regions (e.g., 4 MB), table 316 is the middle table, and holds predictions for mid-sized regions (e.g., 256 KB), and table 318 is the lowest table, and holds predictions for smallest regions (e.g., 4 KB). In these embodiments, the predictions in tables 314-318 are "regional" predictions that indicate a likelihood that any memory requests directed to the corresponding regions of main memory 106 will encounter a hit in cache 200. Thus, for a range of cache blocks/addresses in each of the regions in main memory 106, the prediction is the same.

Address 300 in FIG. 3 includes address information from a memory request for which a prediction is to be determined by prediction mechanism 216. For example, when the address for the memory request is 48 bits long, address 300 may include the 48 address bits. As another example, address 300 may include the 48 address bits plus additional information such as a value representing the source of the memory request, a value representing an operating mode of main memory 106/cache 200, and/or other values. Generally, address 300 can include any information that is useful for indexing/identifying predictions in tables 314-318 in prediction mechanism 216.

Portions 302-306 are portions of address 300 (e.g., a portion of the bits in address 300 and/or other address information) that are used to compute indices for looking up predictions in tables 314-318. In some embodiments, portions 302-306 are configured in accordance with the size of the region of main memory 106 for which the corresponding table holds predictions. For example, in some embodiments where table 314 holds predictions for 4 MB regions and address 300 is 48 bits, portion 302 includes bits 47-22 of address 300. As another example, in some embodiments where table 316 holds predictions for 256 KB regions and address 300 is 48 bits, portion 304 includes bits 47-18 of address 300.

Index generators ("IDX GEN") 308-312 are functional blocks associated with tables 314-318, respectively, that are configured to perform operations for using tables 314-318. Index generators 308-312 include one or more circuits for computing indices for corresponding tables 314-318. For example, in some embodiments, Index generators 308-312 include one or more of combinatorial logic circuits (AND, XOR, etc.), circuits that perform mathematical functions (e.g., add, subtract, multiply, etc.), circuits that perform bit-level operations (e.g., shift, invert, rotate, mask, etc.), and/or other circuits. Using index generator 308 as an example, when a prediction for address 300 is to be looked up in table 314, index generator 308 performs one or more operations to compute an index using portion 302 and then forwards the computed index to lookup circuits in table 314 to enable the lookup of a prediction.

In some embodiments, the circuits for computing indices in some or all of index generators 308-312 are configured to compute the result of a hash function for which the input is the corresponding portion 302-306 and the result is the index for the corresponding table. In these embodiments, computing the result of the hash function comprises performing one or more predetermined operations (combinatorial, bit-level, mathematical, and/or other operations) on the corresponding portion 302-306 to compute the index. In some embodiments, the hash function is different for one or more of tables 314-318.

Tables 314-318 each include memory circuits and lookup circuits. In some embodiments, the memory circuits in table 314 are configured differently than the memory circuits in tables 316-318 (for a reason described below). In these embodiments, the memory circuits in table 314 are configured as number of entries, each of which includes an index, a prediction (an index 324 and prediction 326 for an example entry 322 are labeled in table 314), and optionally includes metadata (valid flag, etc.) (not shown) for the entry. The index is a value that is used to determine the entry in the memory circuits in table 314 from which a prediction is to be retrieved/acquired and the prediction is a value that indicates whether memory requests directed to a corresponding region of main memory 106 are predicted to hit in cache 200. For tables 316-318, the memory circuits are also configured as number of entries, each of which includes an index, a prediction, and optionally includes metadata (valid flag, etc.) (not shown) for the entry. However, unlike table 314, the entries in tables 316-318 also include a tag (index 324, tag 325, and prediction 326 for an example entry are labeled in tables 316-318). In tables 316-318, the index is a value that is used to determine the entry in the memory circuits in the corresponding table from which a prediction is to be retrieved/acquired (when such a prediction exists) and the prediction is a value that indicates whether memory requests directed to a corresponding region of main memory 106 are predicted to hit in cache 200. The tags in the entries in tables 316-318 contain information that indicates a specific region of main memory 106 for which the entry contains a prediction (when the entry contains a prediction).

Although each of tables 314-318 are shown with six entries for illustrative purposes, in some embodiments, the tables include a larger number of entries. In addition, although each of tables 314-318 are shown with the same number of entries for illustrative purposes, in some embodiments one or more of tables 314-318 has a different number of entries than the other tables.

In some embodiments, table 314 is a "base table" in which the memory circuits hold predictions used for each region in main memory 106. In some of these embodiments, table 314 includes memory circuits with sufficient entries to hold a prediction for each corresponding region in main memory 106. In these embodiments, each entry/index in table 314 holds a separate/unique prediction for the corresponding region of main memory 106. In other embodiments, table 314 includes a number of entries that is too small to simultaneously hold a separate/unique prediction for each region of main memory 106. In these embodiments, when generating indices, index generator 308 may generate the same index for memory requests to one or more regions of main memory 106 (i.e., there may be "collisions" within table 314). Thus, in some cases, the prediction for memory requests to one or more separate regions of main memory 106 are retrieved from the same entry in table 314, and are therefore predicted using the same prediction. In some embodiments, table 314 is configured in this way to avoid the need for a table that is large enough to hold separate predictions for each region of main memory 106. (In embodiments where individual predictions are used for multiple regions—and are perhaps incorrect for at least some of the multiple regions—there is no issue of data correctness, as memory requests are eventually handled/processed correctly, despite an incorrect prediction.)

In some embodiments, tables 316-318 include a limited number of entries (e.g., 132, 60, etc.) and hence do not include sufficient entries for holding a prediction for each corresponding region in main memory 106. Thus, in these embodiments, tables 316-318 cannot simultaneously store a prediction for every corresponding region. Instead, the entries in tables 316-318 are shared, and are therefore made available for storing predictions directed to multiple regions. However, unlike table 314, the prediction in each entry in tables 316-318 is separate/unique and is specific to a particular region in main memory 106. For this reason, the tag in each valid entry in tables 316-318 contains a record of the region in main memory 106 to which the prediction applies. In these embodiments, the tags can include any information that can be used for distinguishing the region of main memory 106 for which the entry holds a prediction (e.g., some or all of address information for the region, an identifier for the region, etc.).

In these embodiments, any of a number of operations/policies can be used for managing the storage of predictions in the limited memory in the tables 316-318. For example, some embodiments use "set associativity" for managing the storage of predictions in tables 316-318 (e.g., predictions from a corresponding different subset of the regions of main memory 106 may be configured to be stored in each set in a group of sets in tables 316-318, etc.). (A general description of set associativity can be seen above in the description of cache 200.) Recall that using set associativity includes using a replacement policy (LRU, etc.) for determining predictions to be replaced in tables 316-318 when new predictions are to be stored in the table.

The lookup circuits in tables 314-318 are functional blocks that, using an index computed by the corresponding index generator 308-312, perform a lookup in the corresponding table for a prediction associated with the index (example lookup circuits ("LUC") 346 are labeled in table 314). If such a prediction is found in the table, the lookup circuits place the prediction on a corresponding prediction 328-332 signal line. If a prediction is found in tables 316-318, the lookup circuits also assert a corresponding hit 334-336 signal line to control the output of multiplexers ("MUX") 338-340 so that prediction mechanism 216 uses a prediction from a lowest table in the hierarchy from which a prediction was retrieved as result prediction 344. In some embodiments, when performing a lookup for a prediction for a given memory request in tables 316-318, the lookup circuits use the index generated from the given memory request to determine an entry in the table. The lookup circuits then check the entry in the table to determine both: (a) if the entry contains a valid prediction and (b) if the tag in the entry indicates that the prediction is for the region of main memory 106 to which the memory request is directed.

In some embodiments, in one or more of tables 314-318, the prediction for each entry comprises a two-bit saturating counter. In these embodiments, each value of the counter equates to a corresponding prediction. For example, 00=strongly predicted to miss, 01=weakly predicted to miss, 10=weakly predicted to hit, and 11=strongly predicted to hit. In these embodiments, the counter for each entry in tables 314-318 is initially set to a default value (and hence prediction mechanism 216 has a default prediction in the entry), and is updated by incrementing and decrementing the counter as described below in accordance with the actual resolution of memory requests. In some embodiments, a different value is used for the prediction, e.g., a single bit that toggles between states for predicted hit and predicted miss, a bit sequence that captures hits (1) and misses (0) for a last N (e.g., 16, 32, etc.) memory requests in the region, a numerical value indicating/encoding hits and misses along with other information such as a priority of the region, etc.

In some embodiments, computing device 100 (processor 102, cache controller 204, an operating system in computing device 100, etc.) dynamically adjusts the size of the regions for one or more of tables 314-318 in prediction mechanism 216 (i.e., adjusts the size of the regions one or more times while operations are being performed at runtime). For example, the adjustment of region size can be from 4 MB in table 314 to 8 MB or to 2 MB. In some embodiments, when adjusting the region size, existing predictions may be flushed from the table (and perhaps lower tables in the hierarchy), combined, or otherwise adjusted.

Although an embodiment of prediction mechanism 216 is presented as an example, some embodiments include a different type of prediction mechanism. For example, in some embodiments, the prediction mechanism includes more or fewer tables (and hence hierarchical levels). As another example, in some embodiments, different functions are used for computing the indices into the table and/or different information from the memory request is used in the functions. As yet another example, in some embodiments the lookup operation and/or the computation of the indices are performed by different configurations of functional blocks. Generally, prediction mechanism 216 can include any combination of functional blocks/circuits that perform the operations herein described.

Additionally, although FIG. 3 is described using an address from the memory request, some embodiments use other information from the memory request or elsewhere, including information about the source of the memory request, information about main memory 106/cache 200, etc.

Performing Lookups for Predictions

As described above, prediction mechanism 216 performs lookups to determine if memory requests are predicted to hit in cache 200. During the lookup, prediction mechanism 216 is configured to perform lookups for predictions for the memory request in the hierarchy of tables 314-318 in parallel. The following describes a lookup operation using prediction mechanism 216 accordance with some embodiments.

The lookup operation starts when index generators 308-312, operating in parallel, each receive a corresponding portion of address 300 (e.g., portions 302-306, respectively) that is to be used to perform a lookup for a prediction for the memory request from which address 300 was acquired. Index generators 308-312 then use the corresponding portion of address 300 compute an index to be used to perform the lookup in tables 314-318. For example, index generators 308-312 can compute the indices using a hash function for each of the index generators 308-312. Index generators 308-312 then communicate the index to the lookup circuits in the corresponding table 314-318. The lookup circuits in tables 314-318 next determine if an index in an entry in table 314-318 matches the index received from the respective index generator 308-312. For example, in some embodiments, the lookup circuits compare the received index with each valid index in the corresponding table to determine if the indices match, and determine that the corresponding table holds a prediction when a match is found. When the corresponding table holds a prediction, the lookup circuits retrieve the prediction from the table and place the prediction (i.e., a value representing the prediction, which can be the prediction itself) on the corresponding prediction 328-332 signal line. Note that, in the case of tables 316-318, when a valid prediction is found with a matching index, the lookup circuits also compare the tag for the entry to tag information generated from the memory request (e.g., from the corresponding portion 304-306) to determine if the prediction applies to the specific region of main memory 106 to which the memory request is directed, and only use the prediction when the tags match. In this way, the lookup circuits for tables 316-318 can retrieve predictions for memory requests to specific regions of main memory 106.

In some embodiments, a prediction should always be present in table 314 (the "base" table) and therefore placed on the prediction 328 signal line following the lookup operation because, as described above, a corresponding prediction from table 314 is used as a prediction for each region. However, a valid prediction may not be present in tables 316 and/or 318 and/or the tag in a valid entry may not match tag information from the memory request. In some embodiments, when the lookup circuits in tables 316 and/or 318 do not find a prediction, the lookup circuits in tables 316 and/or 318 may place a default value on prediction 330 and/or 332 signal lines, may place no value on the prediction 330 and/or 332 signal lines, and/or may leave prediction 330 and/or 332 signal lines unchanged. In these embodiments, the value on prediction 330 and/or 332 signal lines should not matter because the hit 334 and/or 336 signal lines should remain deasserted after an unsuccessful lookup in tables 316 and/or 318, as described below.

As can be seen in FIG. 3, hit 334 and hit 336 signal lines are coupled between tables 316-318 and a select input on multiplexers 338-340, respectively. In these embodiments, when, during a lookup, it is determined that one or both of tables 316 and/or 318 holds a prediction for a given index and for the specific region of main memory 106, in addition to retrieving the prediction from table 316 and/or 318 and placing a value for the prediction on the prediction 330 and/or 332 signal lines, respectively, the lookup circuits in tables 316-318 assert the corresponding hit 334 or 336 signal line. When asserted, the hit 334 signal line causes the prediction 330 input into multiplexer ("MUX") to be selected to be forwarded to the output of multiplexer 338 (i.e., to be placed on prediction 342 signal line) instead of the prediction 328 input. Similarly, when asserted, hit 336 signal line causes the prediction 332 input into multiplexer ("MUX") to be selected to be forwarded to the output of multiplexer 340 instead of the prediction 342 input.

Recall that table 314 is the highest table and table 318 is the lowest table in the hierarchy of lookup tables in prediction mechanism 216. By asserting the hit 334 and 336 signal lines as described above, a prediction from the lowest table in the hierarchy of tables in prediction mechanism 216 that holds a prediction is preferentially forwarded to result prediction 344. For example, assuming that tables 314 and 316 hold predictions, but that table 318 does not, the lookup circuits in table 314 retrieve the prediction from table 314 and place a value for the prediction on the prediction 328 signal line and the lookup circuits in table 316 retrieve the prediction from table 316 and place a value for the prediction on the prediction 330 signal line. In addition, the lookup circuits in table 316 assert the hit 334 signal line. Because the hit 334 signal line is asserted, the prediction 330 input to multiplexer 338 is selected to be placed on the output of multiplexer 338 (i.e., on the prediction 342 signal line). Because no prediction was found in table 318, the hit 336 signal line is not asserted, meaning that the prediction 342 input to multiplexer 340 is selected to be placed on the output of multiplexer 340, and hence to be result prediction 344. These operations make the prediction from table 316 (i.e., the lowest table in which a prediction was found) the result prediction 344.

Result prediction 344 is used by cache controller 204 to determine if an attempt to resolve the memory request is to be made in cache 200 or if the memory request is to be sent to a lower level of a memory hierarchy for resolution (or for other operations in computing device 100—whether to operate circuits in a power-down mode, etc.). For example, if the prediction that is forwarded from multiplexer 340 is that the memory request from which address 300 was acquired is to be a hit (e.g., the value of the prediction indicates a likely hit in cache 200 for the memory request), cache controller 204 can attempt to resolve the memory request in cache 200.

Updating and Adding Predictions to the Tables

In some embodiments, cache controller 204 includes mechanisms for updating predictions in/adding predictions to tables 314-318. Recall that, as described above, in some embodiments, table 314 includes a prediction that is used for every corresponding region in main memory 106, so predictions should not need to be added to (or removed from) table 314. Thus, only updates should be performed for the predictions in table 314. However, in some embodiments, tables 316-318 do not include predictions for every corresponding region in main memory 106, so predictions may be updated in tables 316-318, added to tables 316-318, and removed from tables 316-318.

In some embodiments, when updating a prediction, prediction mechanism 216 receives from cache controller 204 an address 300 and an indication of how the prediction is to be updated (incremented, decremented, adjusted, replaced with a new value, etc.). Prediction mechanism 216 signals index generators 308-312 and the lookup circuits for the corresponding tables 314-318 that the prediction for address 300 is to be updated and how the prediction is to be updated. Index generators 308-312 compute an index using a corresponding portion of address 300 (e.g., portion 302-306) and send the computed index to the lookup circuits in the corresponding table. The lookup circuits perform a lookup using the index to determine if a matching index (and hence an associated prediction) is found in the table. When an associated prediction is found in the table, the lookup circuits update the associated prediction as instructed (otherwise the update request is ignored). In tables 316-318, the tag for the matching index is also compared to tag information from the memory request, and the corresponding entry is only updated when there is a match (and hence when the existing entry in table 316-318 is for the same specific region of main memory 106).

For example, in some embodiments, each prediction is implemented using a two-bit counter in entries in tables 314-318. In these embodiments, cache controller 204 can signal prediction mechanism 216 that the counter is to be incremented when the prediction is being updated to more strongly predict a hit or decremented when the prediction is being updated to more strongly predict a miss. In these embodiments, the counter saturates at the values 00, which strongly predicts a miss, and 11, which strongly predicts a hit.

In some embodiments, when adding a prediction, prediction mechanism 216 receives from cache controller 204 an address 300 and an indication that a prediction is to be added to a lowest table where the prediction does not yet exist. Recall that table 314 (the "base" table) includes a prediction that is used for every region of main memory 106. Thus, when a prediction is added, the prediction should only be added to one of table 316 or table 318. In some embodiments, prediction mechanism 216 therefore signals index generators 310-312 and the lookup circuits for the corresponding tables 316-318 that the prediction for address 300 is to be added to the lowest table for which the prediction does not exist. Index generators 310-312 compute an index using a corresponding portion of address 300 (e.g., portion 304-306) and send the computed index to the lookup circuits in the corresponding table. The lookup circuits perform a lookup using the index to determine if a matching index (and hence an associated prediction) is found in the table. For a highest table for which an associated prediction is not found, the lookup circuits add the associated prediction as instructed (otherwise the add request is ignored). In these embodiments, adding the prediction includes adding the tag and the prediction to an entry in the highest table for which an associated prediction is not found.

Recall that, in some embodiments, one or both of tables 316-318 are set associative and are managed using a replacement policy such as LRU. In these embodiments, when a prediction is added to one of the tables, an existing prediction may need to be replaced with the new prediction. In these embodiments, the existing prediction to be deleted can be chosen in accordance with the replacement policy.

In some embodiments, predictions are added to particular lower tables in the hierarchy when a prediction is determined to be incorrect in a next higher level in the hierarchy. For example, a prediction can be added to table 318 when the prediction in table 316 is determined to be incorrect. When the prediction is added to the lower table, the prediction can be added with a given value (e.g., strongly predicted to miss, weakly predicted to hit, etc.). In this way, the higher table contains a general prediction for a larger region (e.g., 4 MB, 256 KB, etc.), and the lower table contains a more specific (and possibly more accurate) prediction for a sub-region of the larger region (e.g., 256 KB, 4 KB, etc.). In some embodiments, when adding a prediction to the lower level table in the hierarchy, cache controller 204 also updates the prediction in the higher level(s) of the hierarchy. This can help to ensure that the predictions for the associated larger regions are updated to reflect current and general hit/miss outcomes in the higher tables.

Process for Looking Up Predictions and Adding/Updating Predictions

Figure 4:
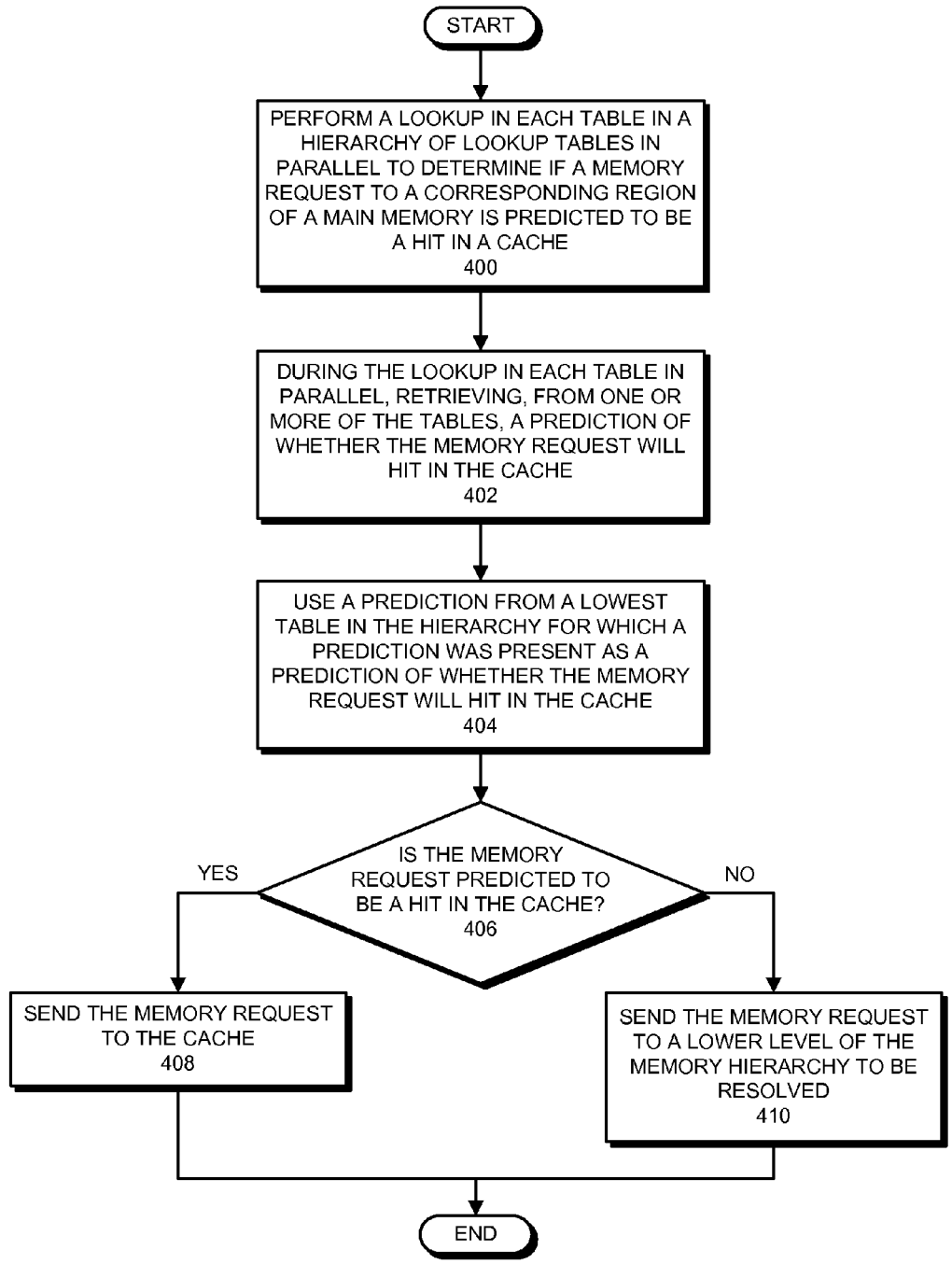
FIG. 4 presents a flowchart illustrating a process for determining a prediction for a memory request in accordance with some embodiments.

FIG. 4 presents a flowchart illustrating a process for determining a prediction for a memory request in accordance with some embodiments. Note that the operations shown in FIG. 4 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms can perform the operations.

Recall that a hit in a cache generally occurs when a cache block is present in the cache. Therefore, a prediction that a memory request is to be a hit in the cache is a prediction of whether the underlying cache block is present in the cache. Although the process in FIG. 4 is described using a prediction of a hit for a memory request in cache 200, some embodiments predict different outcomes or combinations of outcomes for memory requests in cache 200. For example, along with or instead of predicting hits for memory requests, some embodiments predict one or more of misses in the cache for memory requests, invalid cache lines in the cache for memory requests, cache lines with a given coherency state (modified, shared, exclusive, etc.) in the cache, and/or other outcomes for memory requests. Generally, the described embodiments can make any prediction of an outcome of a memory request in cache that can occur as an outcome of processing a memory request in the cache.

In the following example, cache 200 is used to describe example operations performed by some embodiments. Recall that cache 200 is a general example of the caches in the memory hierarchy. Thus, any of the L1 caches 116-122, L2 cache 124, and L3 cache 104 can be implemented with similar internal mechanisms to cache 200, and can therefore perform some or all of the example operations in the same way. Additionally, in this description, the "next lower level of the memory hierarchy" from cache 200 refers to a cache or memory below cache 200 in the hierarchy, which is dependent on which cache is represented by cache 200. For example, in embodiments where cache 200 is L3 cache 104, the next lower level of the memory hierarchy is main memory 106. As another example, in embodiments where cache 200 is L2 cache 124, the next lower level of the memory hierarchy is L3 cache 104.

The process shown in FIG. 4 starts when prediction mechanism 216 performs a lookup in each table in a hierarchy of lookup tables in parallel to determine if a memory request to a corresponding region of main memory 106 is predicted to be a hit in the cache (step 400). For example, in some embodiments, for a corresponding portion 302-306 of address 300 from a memory request, each index generator 308-312 computes an index for each of tables 314-318. Each index generator 308-312 then communicates the computed index to lookup circuits in the corresponding table. The lookup circuits perform a lookup in each of tables 314-318 using a corresponding computed index. Note that these operations occur in parallel in that index generators 308-312 receive the portions 302-306 of address 300 in parallel and start the lookup processes in the corresponding table immediately after having computed the indices. Thus, the lookup circuits in each of tables 314-318 should perform the lookups substantially simultaneously/in parallel. Recall that performing the lookup in tables 316-318 includes comparing tag information for the memory request to tag information at the entry (if any) found in either of tables 316-318 using the index.

Next, during the lookup in each of tables 314-318, prediction mechanism 216 retrieves, from one or more of tables 314-318, a prediction of whether the memory request is to be a hit in the cache 200 (step 402). For example, when the lookup in the corresponding table finds a prediction, the lookup circuits can place the prediction (i.e., a value representing the prediction) on the corresponding prediction 328-332 signal line. For example, if the signal line includes two individual signal lines and the prediction is a two bit counter, the logical levels (zero or one) of the two bits in the two bit counter can be placed on the corresponding prediction 328-332 signal line by the lookup circuits.

Prediction mechanism 216 then uses a prediction from a lowest table in the hierarchy for which a prediction was present as a prediction of whether the memory request will hit in the cache (step 404). For example, when the lookup circuits in one or both of tables 316-318 encounter a prediction in the table, the lookup circuits assert the corresponding hit 334-336 signal line. As described above, this causes the prediction 330 and/or 332 signal input to multiplexers 338 and/or 340 to be selected as the output of the multiplexer(s). Because the predictions from each table have been placed on the corresponding prediction 330-332 signal lines (when such predictions exist in tables 316-318), the lowest table's prediction is placed on the result prediction 344 signal line via multiplexers 338 and 340.

Next, cache controller 204 determines, using the prediction on result prediction 344 signal line, if the memory request is predicted to be a hit in cache 200 (step 406). If so, cache controller 204 sends the memory request to the cache (step 408). Otherwise, cache controller 204 sends the memory request to a lower level of the memory hierarchy to be resolved (step 410).

In some embodiments, cache controller 204 uses the prediction to perform one or more additional or other operations in computing device 100 (i.e., in addition to or aside from determining where to send memory requests). For example, cache controller 204 can use the prediction to determine if one or more portions of the memory circuits 202 in the cache should be placed in a low-power or full-power operating mode, if a corresponding processor core 108-114 should be placed in a low-power mode, etc.

Figure 5:
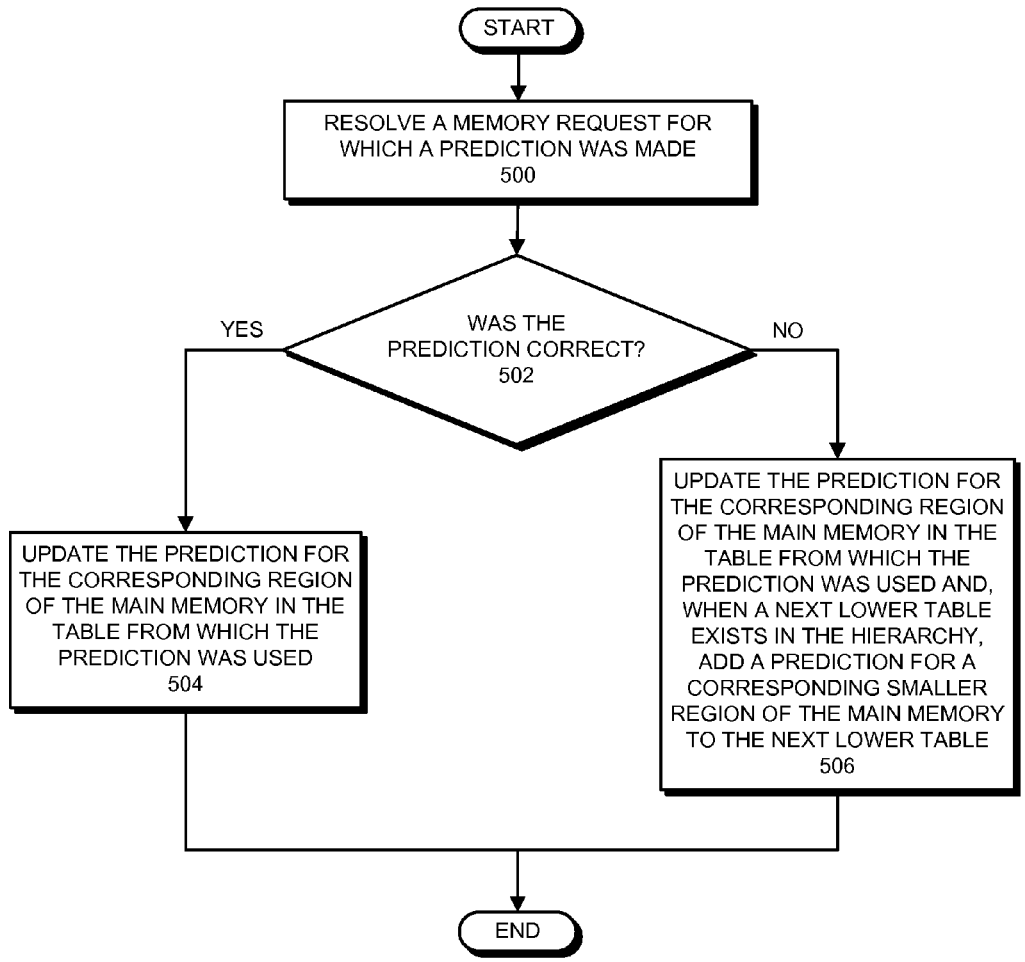
FIG. 5 presents a flowchart illustrating a process for updating a prediction in/adding a prediction to a prediction mechanism in accordance with some embodiments.

FIG. 5 presents a flowchart illustrating a process for updating/adding a prediction to a prediction mechanism in accordance with some embodiments. Note that the operations shown in FIG. 5 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms can perform the operations.

In the following example, cache 200 is used to describe example operations performed by some embodiments. Recall that cache 200 is a general example of the caches in the memory hierarchy. Thus, any of the L1 caches 116-122, L2 cache 124, and L3 cache 104 can be implemented with similar internal mechanisms to cache 200, and can therefore perform some or all of the example operations in the same way. Additionally, in this description, the "next lower level of the memory hierarchy" from cache 200 refers to a cache or memory below cache 200 in the hierarchy, which is dependent on which cache is represented by cache 200. For example, in embodiments where cache 200 is L3 cache 104, the next lower level of the memory hierarchy is main memory 106. As another example, in embodiments where cache 200 is L2 cache 124, the next lower level of the memory hierarchy is L3 cache 104.

The process shown in FIG. 5 starts when cache controller 204 determines that a memory request for which a prediction was made (e.g., as described in FIG. 4) has been resolved (step 500). Cache controller 204 then determines if the prediction was correct (step 502). For example, cache controller 204 can determine if the memory request was predicted to hit in cache 200, but actually missed. In some embodiments, cache controller 204 and/or memory requests include tracking mechanisms (records, flags, etc.) to enable the determination of whether the prediction was correct.

When the prediction was correct, cache controller 204 updates the prediction for the corresponding region of main memory 106 in the table from which the prediction was used (step 504). For example, if a prediction was found in table 318 (and passed to result prediction 344 via multiplexer 340), cache controller 204 can update table 318 to reinforce the prediction (e.g., update a prediction from weakly predicted to hit to strongly predicted to hit).

When the prediction was incorrect, cache controller 204 updates the prediction for the corresponding region of main memory 106 in the table from which the prediction was used and, when a next lower table exists in the hierarchy, adds a prediction for a corresponding smaller region of main memory 106 to the next lower table (step 506). For example, if a prediction from table 316 was used (meaning that a prediction for the memory request did not, at that time, exist in table 318), cache controller 204 can update table 316 to correct the prediction (e.g., update a prediction from weakly predicted to hit to weakly predicted to miss). Cache controller 204 can also add an entry for the memory request (i.e., the address for the memory request) to table 318 as described above.

Figure 6:
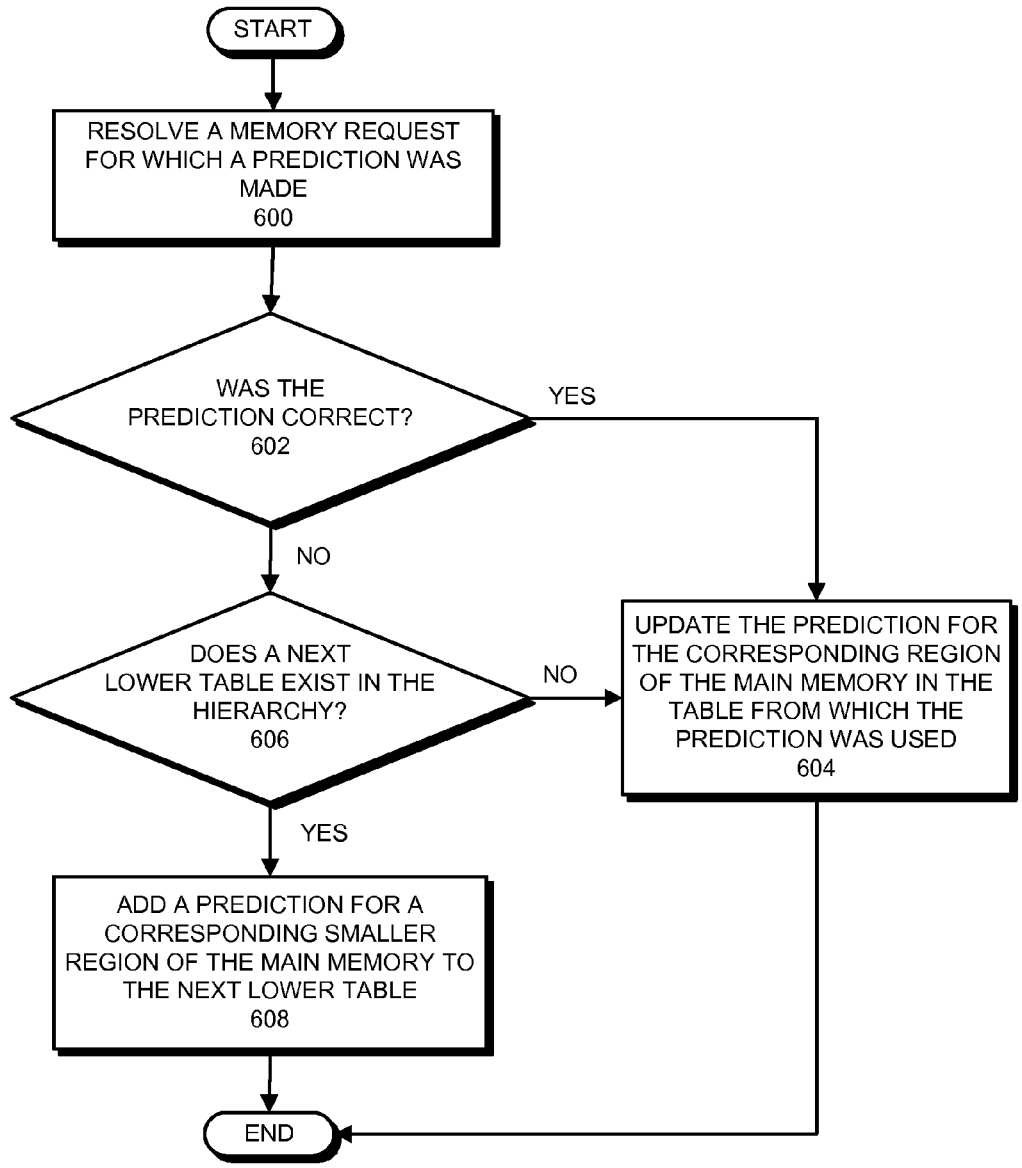
FIG. 6 presents a flowchart illustrating a process for updating/adding a prediction to a prediction mechanism in accordance with some embodiments.

FIG. 6 presents a flowchart illustrating a process for updating/adding a prediction to a prediction mechanism in accordance with some embodiments. Note that the operations shown in FIG. 6 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms can perform the operations.

In the following example, cache 200 is used to describe example operations performed by some embodiments. Recall that cache 200 is a general example of the caches in the memory hierarchy. Thus, any of the L1 caches 116-122, L2 cache 124, and L3 cache 104 can be implemented with similar internal mechanisms to cache 200, and can therefore perform some or all of the example operations in the same way. Additionally, in this description, the "next lower level of the memory hierarchy" from cache 200 refers to a cache or memory below cache 200 in the hierarchy, which is dependent on which cache is represented by cache 200. For example, in embodiments where cache 200 is L3 cache 104, the next lower level of the memory hierarchy is main memory 106. As another example, in embodiments where cache 200 is L2 cache 124, the next lower level of the memory hierarchy is L3 cache 104.

The process shown in FIG. 6 starts when cache controller 204 determines that a memory request for which a prediction was made (e.g., as described in FIG. 4) has been resolved (step 600). Cache controller 204 then determines if the prediction was correct (step 602). For example, cache controller 204 can determine if the memory request was predicted to hit in cache 200, but actually missed. In some embodiments, cache controller 204 and/or memory requests include tracking mechanisms (records, flags, etc.) to enable the determination of whether the prediction was correct.

When the prediction was correct, cache controller 204 updates the prediction for the corresponding region of main memory 106 in the table from which the prediction was used (step 604). For example, if a prediction was found in table 318 (and passed to result prediction 344 via multiplexer 340), cache controller 204 can update table 318 to reinforce the prediction (e.g., update a prediction from weakly predicted to hit to strongly predicted to hit).

When the prediction was incorrect, cache controller 204 determines if there is a next lower level table in the hierarchy (step 606). If not, cache controller 204 updates the prediction for the corresponding region of main memory 106 in the table from which the prediction was used (step 604). Otherwise, when a next lower table exists in the hierarchy, cache controller 204 adds a prediction for a corresponding smaller region of main memory 106 to the next lower table (step 608). For example, if a prediction from table 316 was used (meaning that a prediction for the memory request did not, at that time, exist in table 318), cache controller 204 can add an entry for the memory request to table 318.

Although various updating/adding operations are described for FIGS. 5 and 6, in some embodiments, different operations are used. Generally, any combination of updating/adding can be used that enables prediction mechanism 216 to make timely, accurate predictions for memory requests in cache 200.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a cache, comprising:
in a prediction mechanism, performing operations for:
performing a lookup in each table in a hierarchy of lookup tables in parallel to determine if a memory request is predicted to be a hit in the cache, each table in the hierarchy comprising predictions whether memory requests to corresponding regions of a main memory will hit in the cache, each of the regions in a given table including a corresponding number of addresses in the main memory, wherein the regions include a smaller number of addresses in the main memory for each table lower in the hierarchy.

2. The method of claim 1, wherein performing the lookup in each table in the hierarchy comprises:
computing an index for each table in the hierarchy using information from the memory request, the index indicating a location in the corresponding table of a prediction of whether the memory request will hit the cache; and
using each index to retrieve, from the corresponding table, a prediction of whether the memory request will hit in the cache.

3. The method of claim 2, wherein computing the index for each table in the hierarchy using information from the memory request comprises:
computing a result of a hash function for each table, the hash function taking the information from the memory request as an input and outputting an index for the corresponding table.

4. The method of claim 1, wherein the method further comprises:
during the lookup in each table in the hierarchy in parallel, retrieving, from one or more of the tables, a prediction of whether the memory request will hit in the cache; and
using a prediction from a lowest table in the hierarchy from which a prediction was retrieved to determine if the memory request is predicted to be a hit in the cache.

5. The method of claim 4, wherein the method further comprises:
resolving the memory request;
determining that the prediction was correct; and
updating the prediction for the corresponding region of the main memory in the table from which the prediction was used.

6. The method of claim 4, wherein the method further comprises:
resolving the memory request;
determining that the prediction was incorrect; and
updating the prediction for the corresponding region of the main memory in the table from which the prediction was used.

7. The method of claim 4, wherein the method further comprises:
resolving the memory request;
determining that the prediction was incorrect; and
when a next lower table from the table from which the prediction was used exists in the hierarchy, adding a prediction for a corresponding smaller region of the main memory to the next lower table.

8. The method of claim 7, wherein the method further comprises:
upon determining that the prediction was incorrect, updating the prediction for the corresponding region of the main memory in the table from which the prediction was used.

9. The method of claim 7, wherein adding the prediction for corresponding smaller region of the main memory to a next lower table of the hierarchy comprises replacing an existing entry with the prediction.

10. The method of claim 1, wherein the method further comprises:
sending the memory request to the cache for resolution when the memory request is predicted to be a hit in the cache; and
sending the memory request to a lower level of the memory hierarchy when the memory request is not predicted to be a hit in the cache.

11. The method of claim 1, wherein the method further comprises:
dynamically setting a size of the regions of the main memory for at least one corresponding table in the hierarchy.

12. An apparatus that operates a cache, comprising:
a prediction mechanism configured to:
perform a lookup in each table in a hierarchy of lookup tables in parallel to determine if a memory request is predicted to be a hit in the cache, each table in the hierarchy comprising predictions whether memory requests to corresponding regions of a main memory will hit in the cache, each of the regions in a given table including a corresponding number of addresses in the main memory, wherein the regions include a smaller number of addresses in the main memory for each table lower in the hierarchy.

13. The apparatus of claim 12, wherein, when performing the lookup in each table in the hierarchy, the prediction mechanism is configured to:
compute an index for each table in the hierarchy using information from the memory request, the index indicating a location in the corresponding table of a prediction of whether the memory request will hit in the cache; and use each index to retrieve, from the corresponding table, a prediction of whether the memory request will hit in the cache.

14. The apparatus of claim 13, wherein, when computing the index for each table in the hierarchy using information from the memory request, prediction mechanism configured to:
compute a result of a hash function for each table, the hash function taking the information from the memory request as an input and outputting an index for the corresponding table.

15. The apparatus of claim 12, wherein during the lookup in each table in the hierarchy in parallel, prediction mechanism configured to retrieve, from one or more of the tables, a prediction of whether the memory request will hit in the cache; and
wherein the prediction mechanism is further configured to use a prediction from a lowest table in the hierarchy from which a prediction was retrieved to determine if the memory request is predicted to be a hit in the cache.

16. The apparatus of claim 15, further comprising:
a cache controller configured to:
resolve the memory request;
determine that the prediction was correct; and
update the prediction for the corresponding region of the main memory in the table from which the prediction was used.

17. The apparatus of claim 15, further comprising:
a cache controller configured to:
resolve the memory request;
determine that the prediction was incorrect; and
update the prediction for the corresponding region of the main memory in the table from which the prediction was used.

18. The apparatus of claim 15, further comprising:
a cache controller configured to:
resolve the memory request;
determine that the prediction was incorrect; and
when a next lower table from the table from which the prediction was used exists in the hierarchy, add a prediction for a corresponding smaller region of the main memory to the next lower table.

19. The apparatus of claim 18, wherein, upon determining that the prediction was incorrect, the cache controller is further configured to update the prediction for the corresponding region of the main memory in the table from which the prediction was used.

20. The apparatus of claim 18, wherein, when adding the prediction for corresponding smaller region of the main memory to a next lower table of the hierarchy, the cache controller is further configured to:
replace an existing entry with the prediction.

21. The apparatus of claim 12, further comprising:
a cache controller configured to:
send the memory request to the cache for resolution when the memory request is predicted to be a hit in the cache; and
send the memory request to a lower level of the memory hierarchy when the memory request is not predicted to be a hit in the cache.

22. The apparatus of claim 12, wherein the prediction mechanism is configured to:
dynamically set a size of the regions of the main memory for at least one corresponding table in the hierarchy.

23. A non-transitory computer-readable storage medium storing instructions that, when executed by a computing device, cause the computing device to perform method for operating a cache, the method comprising:
performing a lookup in each table in a hierarchy of lookup tables in parallel to determine if a memory request is predicted to be a hit in the cache, each table in the hierarchy comprising predictions whether memory requests to corresponding regions of a main memory will hit in the cache, each of the regions in a given table including a corresponding number of addresses in the main memory, wherein the regions include a smaller number of addresses in the main memory for each table lower in the hierarchy.

* * * * *